US 10,459,980 B2

(12) United States Patent
Kuo et al.

(10) Patent No.: US 10,459,980 B2
(45) Date of Patent: Oct. 29, 2019

(54) DISPLAY SYSTEM, METHOD AND COMPUTER READABLE RECORDING MEDIA FOR AN ISSUE

(71) Applicant: INSTITUTE FOR INFORMATION INDUSTRY, Taipei (TW)

(72) Inventors: Tai-Ta Kuo, Taoyuan (TW); Ping-I Chen, Taipei (TW)

(73) Assignee: Institute For Information Industry, Taipei (TW)

( * ) Notice: Subject to any disclaimer, the term of this patent is extended or adjusted under 35 U.S.C. 154(b) by 594 days.

(21) Appl. No.: 15/133,779

(22) Filed: Apr. 20, 2016

(65) Prior Publication Data

US 2017/0132237 A1 May 11, 2017

(30) Foreign Application Priority Data

Nov. 9, 2015 (TW) .............................. 104136867 A

(51) Int. Cl.
*G06F 16/9032* (2019.01)
*G06F 16/9535* (2019.01)
(Continued)

(52) U.S. Cl.
CPC ...... *G06F 16/90324* (2019.01); *G06F 16/345* (2019.01); *G06F 16/9024* (2019.01); *G06F 16/9535* (2019.01)

(58) Field of Classification Search
CPC ........... G06F 17/30705; G06F 17/2785; G06F 17/30719; G06F 16/35; G06F 16/278; G06F 16/345; G06Q 30/02; G06Q 50/01
(Continued)

(56) References Cited

U.S. PATENT DOCUMENTS 6,804,688 B2 10/2004 Kobayashi et al.
9,817,893 B2 * 11/2017 Jaidka ............... G06F 17/30719
(Continued)

FOREIGN PATENT DOCUMENTS

CN 101571853 A 11/2009
CN 103218410 A 7/2013
TW 201401202 A 1/2014

OTHER PUBLICATIONS

Taiwan Patent Office, Office action dated Oct. 31, 2016.

*Primary Examiner* — Shahid A Alam
(74) *Attorney, Agent, or Firm* — Skaar Ulbrich Macari, P.A.

(57) ABSTRACT

A display system for an issue comprises an input unit, a display unit and an processing unit. The input unit receives an initial keyword corresponding to an issue. The display unit displays at least a derivative issue generated from the issue during a time period according to time-based characteristics. The processing unit coupled to the input unit and the display unit obtains tags of subject contents of web pages, and obtains a present keywords group according to co-occurrence correlation of the tags. The processing unit analyzes the correlation between the present keywords calculated based on social voice, analyzing overlap rate for the present keywords compared with the initial keywords, and compares correlation between the present keywords with correlation between the initial keywords calculated based on social voice, in order to determine whether at least one of the derivative issue is generated.

17 Claims, 9 Drawing Sheets

(51) Int. Cl.
*G06F 16/901* (2019.01)
*G06F 16/34* (2019.01)

(58) Field of Classification Search
USPC .......................................................... 707/771
See application file for complete search history.

(56) References Cited

U.S. PATENT DOCUMENTS

| | | | |
|---|---|---|---|
| 9,830,386 B2* | 11/2017 | Huang | G06F 17/30705 |
| 2008/0275899 A1 | 11/2008 | Baluja et al. | |
| 2016/0012818 A1* | 1/2016 | Faizakof | G06F 17/30705 |
| | | | 704/245 |
| 2016/0026687 A1* | 1/2016 | Aitchison | G06F 17/30654 |
| | | | 707/694 |

* cited by examiner

DISPLAY SYSTEM, METHOD AND COMPUTER READABLE RECORDING MEDIA FOR AN ISSUE

BACKGROUND OF THE INVENTION

1. Field of the Invention

The instant disclosure relates to a display system, a method and a computer readable recording media for an issue; in particular, the instant disclosure relates to a display system, a method and a computer readable recording media for an issue which can automatically judge and generate the derivative issue.

2. Description of Related Art

People often get information on the Internet. When an event or social phenomena is taking place, a lot of web pages having related information appear on the Internet. For example, when a food safety incident happens, large numbers of food safety related information appear on news media or social media. Moreover, people also discuss on the Internet based on the information distributed on the Internet, thus the network public opinion is established.

The existing network public opinion analysis system is the search engine type, which performs searching according to keywords set, listing all news articles having the keywords according to the search result, or displaying a relationship graph about keywords. However, during the observation period for public opinion or issues of online communities, sometimes the evolution of the discussed issue is changed. It is hard to do analysis on the original issue to get the subsequent derivative issue and their evaluation process according to the keywords. In conventional analysis, dividing of the derivative issue must be carried out by a human, which causes non-real-time, time-consuming and low efficiency for public opinion analysis. Also, searching web page articles according to original keywords may miss the articles of the derivative issue(s), thus there are concerns about lack of coverage.

SUMMARY OF THE INVENTION

The object of the instant disclosure is to provide a display system, a method and a computer readable recording media for issue, which can avoid identifying of each article and aggregating related topics carried out by human labor, in order to help real-time public opinion analysis and full coverage of public opinion observations.

In order to achieve the aforementioned objects, according to an embodiment of the instant disclosure, a display system for an issue is provided. The display system for an issue comprises an input unit, a display unit and a processing unit. The input unit receives at least an initial keyword corresponding to an issue set by a user. The display unit displays at least a derivative issue generated from the issue during a time period according to time-based characteristics. The processing unit is coupled to the input unit and the display unit. The processing unit obtains a plurality of tags of a plurality of subject contents of web pages, and obtains a present keywords group of the subject contents of web pages according to co-occurrence correlation of the tags, wherein the present keywords group comprises at least a present keyword. Then, the processing unit analyses the correlation between the present keywords calculated based on the amount of social voice. The social voice is an evaluation of people's activities corresponding to the present keywords on the network, such as the number of likes, shares or comments made by the people. The processing unit analyses overlap rate for the present keywords compared with the initial keyword(s). The processing unit compares the correlation of the present keyword(s) and the correlation of the initial keywords calculated based on social voice in order to determine whether at least one derivative issue is generated. And, the processing unit controls the display unit to display the at least one derivative issue when the at least one derivative issue is determined to be generated.

In order to achieve the aforementioned objects, according to an embodiment of the instant disclosure, a display method for an issue is provided. The display method for an issue is executed by a display system for an issue. The display system for an issue comprises an input unit, a display unit and a processing unit. The display method comprises a user utilizing the input unit to set at least an initial keyword corresponding to an issue; the processing unit obtaining a plurality of tags of a plurality of subject contents of web pages, and obtaining a present keywords group of subject contents of web pages according to co-occurrence correlation of the tags, the present keywords group comprising at least a present keyword, then the processing unit analyzing the correlation between the present keywords calculated based on social voice, the processing unit analyzing overlap rate for the present keywords compared with the initial keyword, the processing unit comparing the correlation of the present keywords and the correlation of the initial keywords calculated based on the amount of social voice in order to determine whether at least one derivative issue is generated, and the processing unit controlling the display unit to display the at least one derivative issue when the at least one derivative issue is determined to be generated; and the processing unit controlling the display unit to display the issue and the at least one derivative issue according to time-based characteristics.

In order to achieve the aforementioned objects, according to an embodiment of the instant disclosure, a computer readable recording media is provided. The computer readable recording media stores computer an executable program, when the computer readable recording media is read by a processor the processor executes the computer executable program to perform the display method described above.

In summary, the provided display system, method and computer readable recording media for an issue can obtain a plurality of subject contents of web pages according to at least one initial keyword, and further obtain the present keywords group of subject contents of web pages. Then, obtaining the amount of social voice of the initial keyword(s) and the present keywords group, and calculating correlation between the present keywords and the initial keyword(s), so as to determining whether any derivative issue is generated or not. Accordingly, the evolution process of the issue can be displayed according to time-based characteristics.

In order to further the understanding regarding the instant disclosure, the following embodiments are provided along with illustrations to facilitate the disclosure of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
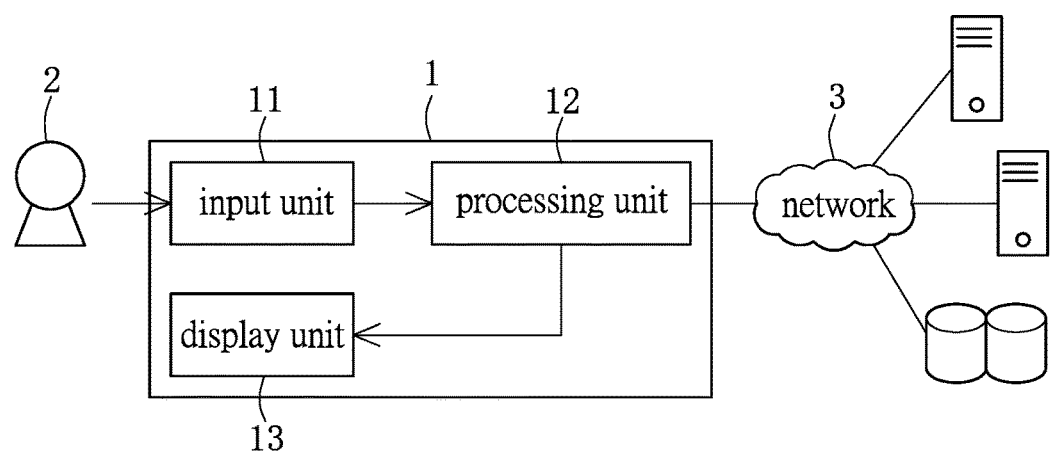
FIG. 1 shows a schematic diagram of a display system for issue according to an embodiment of the instant disclosure.

Please refer to FIG. 1 showing a schematic diagram of a display system for an issue according to an embodiment of the instant disclosure. The display system 1 for an issue comprises an input unit 11, a display unit 13 and a processing unit 12. The input unit 11 and the display unit 13 are coupled to the processing unit 12. The display system 1 for an issue can be set to a network server connecting with a network, but the instant disclosure is not so restricted. A user 2 can manipulate a human-machine interactive interface of the input unit 11 or use a terminal device to connect to the input unit 11 of the network server via the network. The input unit 11 can be presented by a web page or a certain application, but the instant disclosure is not restricted thereto. The mentioned terminal device can be a personal computer, a smart phone, a tablet PC and so on. However, the instant disclosure does not limit the type of the terminal device. The processing unit 12 is connected to a network 3, for collecting the subject contents of web pages of a plurality of websites on the network 3. The display unit 13 is used to display at least one derivative issue during a time period according to time-based characteristics. For example, the display unit 13 can display the relationship of the issue and derivative issue(s) based on a time axis. Details of processing and calculations executed by the display system 1 for issue are further described as follows.

Figure 2:
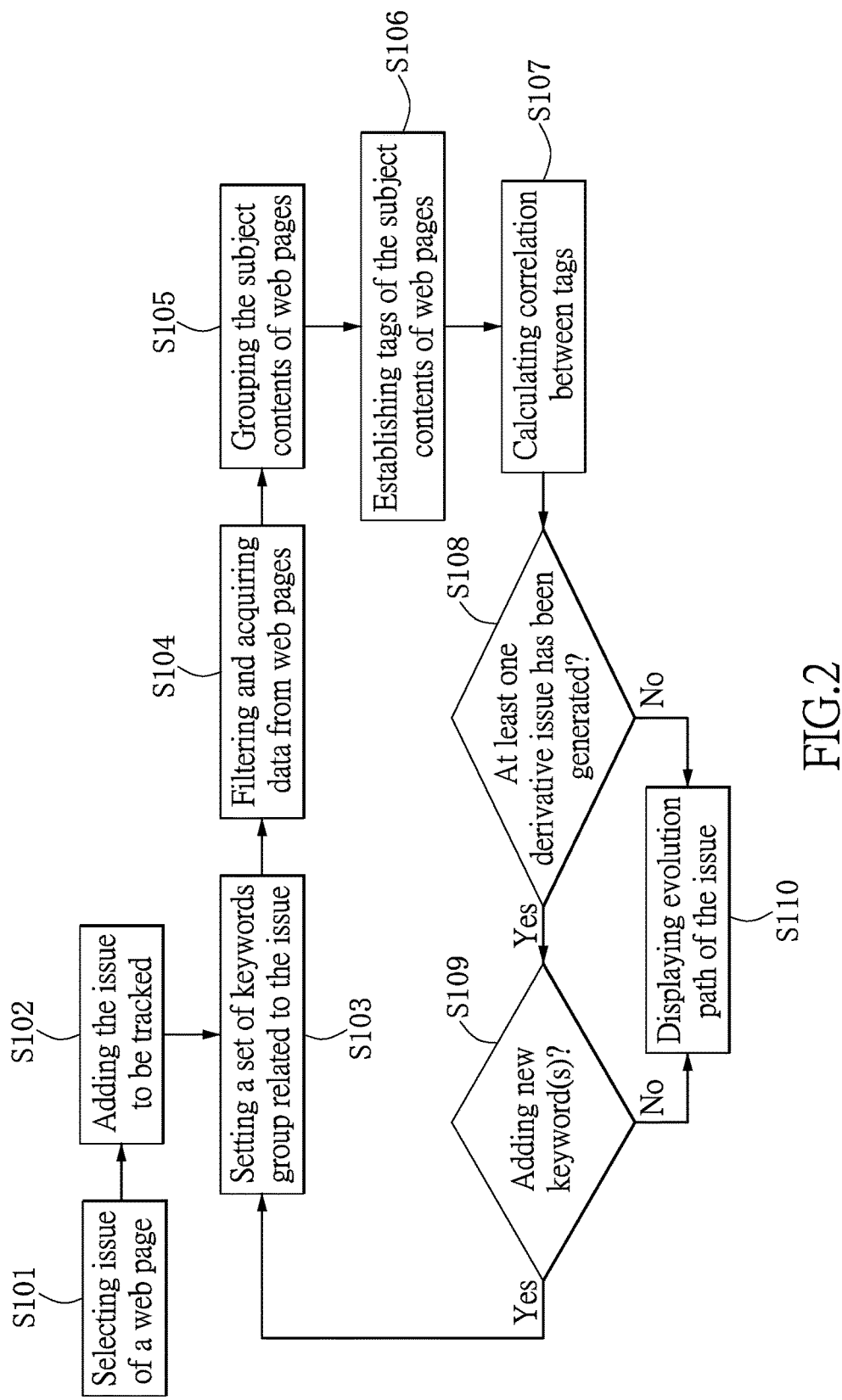
FIG. 2 shows a flow chart of a concept of analyzing and displaying for issue according to an embodiment of the instant disclosure.
Figure 3A:
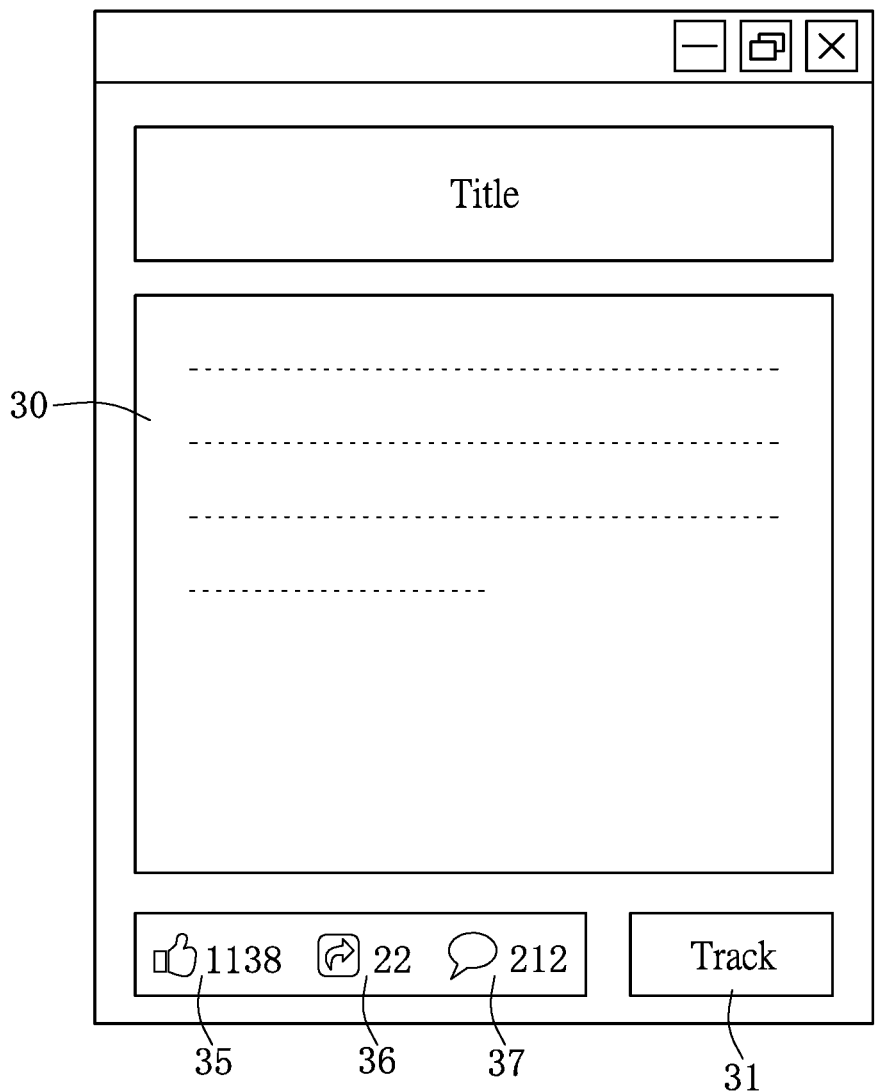
FIG. 3A shows a schematic diagram of a display system for issues displaying a subject content of a web page according to an embodiment of the instant disclosure.
Figure 3B:
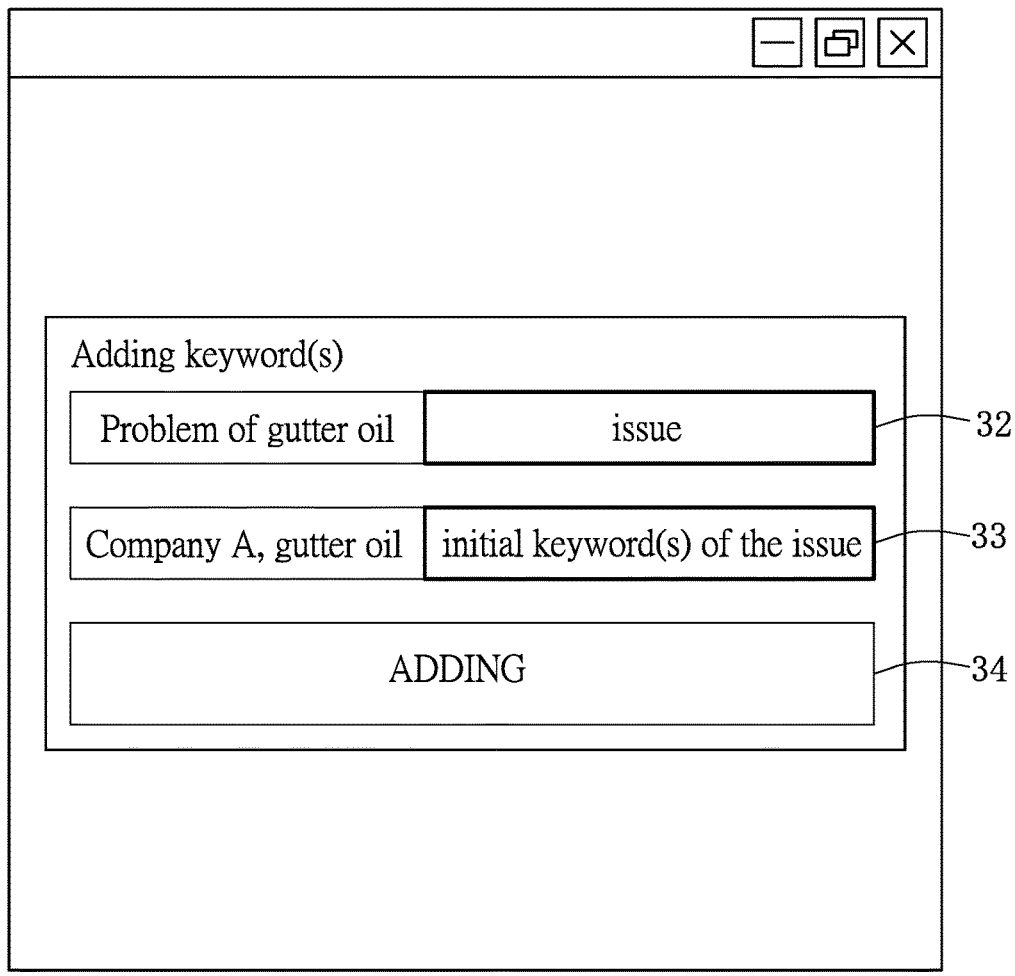
FIG. 3B shows a schematic diagram of an interface for setting to track an issue of a display system for issues according to an embodiment of the instant disclosure.

In the following, a human-machine interactive interface presented by a web page is used as an example of the input unit 11 and the display unit 13, for describing the operation of the display system 1 for issue. Please refer to FIG. 1 in conjunction with FIG. 2. FIG. 2 shows a flow chart of a concept of analyzing and displaying for issue according to an embodiment of the instant disclosure. At first, the user selecting an issue of a web page (step S101). When the user uses the display system 1 for an issue to watch a subject content of a web page, such as a web page article 30 shown in FIG. 3A, the display system 1 for an issue provides and displays a web page button 31 of adding to track with interest (referring to FIG. 3A) for providing the user to set the issue to be followed (step S102). The display system 1 for an issue can provide a link on the web page to be followed for directing the user to an interactive interface on another web page of setting the issue to be followed, referring to FIG. 3B. The user can set the initial keyword 33 about the issue. The initial keyword 33 is not limited to one keyword, and can be multiple keywords. Based on the initial keyword(s) 33 corresponding to the issue 32 set by the user, the display system 1 for an issue can store the initial keyword(s) 33 corresponding to the issue 32 after the user 2 presses the web page button 34 indicating—Adding keyword(s). Alternatively, in another embodiment, after the user 2 presses the web page button 34 (Adding keyword(s)), the initial keyword can be obtained by the input unit 11 receiving the web page article 30 related to the issue set by the user and the processing unit 12 analyzing the content of the web page article 30 (which is one subject content of the web page) related to the issue. However, the instant disclosure does not limit the manner of obtaining the initial keyword(s) performed by the display system 1 for issue.

The aforementioned steps S101 and S102 are the user manipulating the input unit 11 of the display system 1 for issue. The user 2 can set it to follow multiple issues. The subsequent steps S103 to S110 are all performed by automatic process of the display system 1 for issue.

Then, the display system 1 for an issue sets the keyword group (comprising at least one keyword) related to the issue (step S103). And, the display system 1 for an issue filters and acquires data of web pages on the network 3 (step S104). Then, the processing unit 12 can group the subject contents of web pages in the manner of title comparison, text comparison or following of article links (step S105). By grouping the subject contents of web pages, articles with the same or similar subjects can be grouped, for taking advantage of simplifying the process of subsequent analysis or saving the operation time. The display system 1 for an issue can establish a module to follow and provide existing analysis information about the past related issue according to correlations of subject contents of web pages for the followed issue. The social voice is an evaluation of people's activities corresponding to the present keywords on the network, such as the number of likes, shares or comments made by the people. As an example, the display system 1 for issue can automatically show numbers of the likes 35, shares 36, and comments 37 about the subject content of the web page, referring to FIG. 3A. When the user 2 browses the web pages, the display system 1 for an issue also can automatically show basic information of the subject content of a web page, such as any related analysis topics, likes, shares, evaluations and so on.

After the subject contents of web pages have been grouped, according to the grouped subject contents of web pages in each group, the social voice related to the at least one present keyword can be analyzed, overlap rate for the present keyword group comprising the at least one present keyword and the initial keyword can be calculated, and the social voice of the at least one present keyword and the social voice of the initial keyword can be compared. However, the instant disclosure is not so restricted. Alternatively, the step S105 of grouping the subject contents of web pages can be omitted. In the following, a process for the set issue performed by the processing unit 12 of the display system 1 for issue is further described (steps S106 to S110).

In step S106, establishing tags of the subject contents of web pages. Specifically, the processing unit 12 obtains a plurality of tags of a plurality of subject contents of web pages during a set-able (or fixed) time period. The time period can be one day, one week, or one month as a unit, for example, but the instant disclosure is not so restricted. In general, each website on the network 3 corresponds to at least one subject content of the web page (of the website). For example, a website reveals one news item, and the subject content of the news is the full text of the news item. If the news item is set with tags, then the set tags can be used directly. If tags of the news item are not provided, the processing unit 12 can do analysis of full text of the subject content (news) of the web page to obtain a plurality of words by using keywords grouping calculations. Accordingly, one or more main concepts of the news can be fetched to establish the tags.

In this embodiment, the processing unit 12 can find correlations between words according to an existing words-database or algorithm. The mentioned "words" are possible to be the main concepts of the subject contents of web pages, or not. For example, by using normalized google distance tools to find out correlation between words and correlation strength between words. Alternatively, co-occurrence of words in words-database can be used as a basis of defining the correlation (or correlation strength). Then, determining the threshold of the correlation (or correlation strength). When the correlation between two words exceeds the threshold, these two words are set to be correlated. When the correlation between two words does not exceed the threshold, the two words are set to be irrelevant. Accordingly, the relationship graph of the words can be obtained. As an example, referring to a relationship graph shown in FIG. 4, a subject content of a web page includes words 401, 402, 403, 404, 405, 406, 407, 408, 409, 410, 411, 412, 413, 414. Correlated words are connected by lines. Word 402 and word 403 are correlated. Word 407 and word 408 are correlated. Word 404 and word 412 are correlated. Words 410, 411, 412, 413, 414 are correlated.

Figure 4:
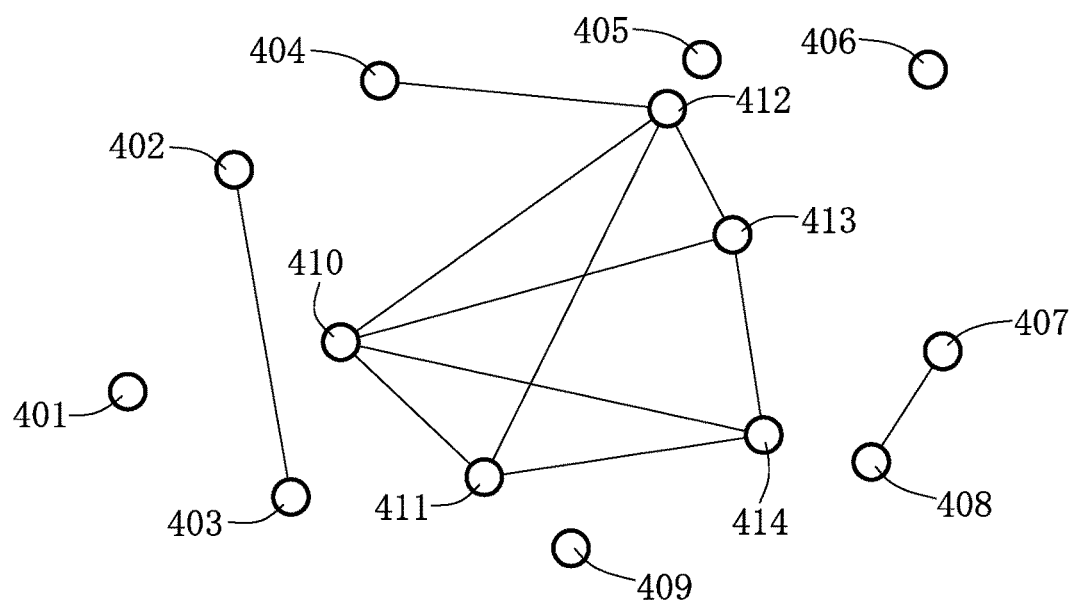
FIG. 4 shows a schematic diagram of a relationship between words according to an embodiment of the instant disclosure.

Then, the processing unit 12 uses K-core algorithm to find out the main concept(s) of the subject content of the web page, in order to establish tags of the subject content of the web page. K-core algorithm is a well-known algorithm for an artisan of ordinary skill in the art, thus there is no need to go into detail. Referring to FIG. 4 as an example, if words 410-414 represent the main concept of the subject content of the web page, the words 410-414 can be set as tags of the subject content of the web page. As mentioned above, the processing unit 12 can establish tags corresponding to a plurality of subject contents of web pages. Therefore, each subject content of each web page corresponds to one or more tags. The processing unit 12 uses an internal data storage element (not shown in the figure) or an exterior storage unit, such as a volatile memory (RAM, for example) or a non-volatile memory (hard-disk, for example) to store the tags.

Then, in step S107, calculating correlation between tags. The processing unit 12 obtains a present keywords group of the subject contents of web pages according to co-occurrence correlation of the tags, wherein the present keywords group comprises at least a present keyword. Specifically, the processing unit 12 determines one tag as the at least one present keyword when the number of the tag occurring in the subject contents of the web pages exceeds a threshold of occurrence. Taking a gutter oil event that happed in Taiwan as an example, for subject contents of all web pages about gutter oil during an initial time period T1, the processing unit 12 analyses the subject contents of web pages to find out the number of tags such as gutter oil, company A, animal feed oil, company B, company C, and Consumers' Foundation occurring in the subject contents of web pages exceeding the threshold of occurrence. Then, the tags including gutter oil, company A, animal feed oil, company B, company C, and Consumers' Foundation are the present keywords. The threshold of occurrence can be determined according to practical applications, but the instant disclosure is not so restricted.

Then, in step S108, determining if at least one derivative issue has been generated. The processing unit 12 determines whether the derivative issue has been generated in two aspects. The first one is comparing the present keywords and the initial keywords (overlap rate evaluation), and even comparing the present keywords group and the former keywords group of the previous period (or the former keywords group of the previous two periods). The second aspect is performing a calculation for correlation between present keywords based on social voice, for evaluating whether the social voice of the present keywords group is louder than the social voice of the former keywords group of the previous period. The above mentioned aspects are both essential conditions for determining whether any derivative issue has been generated. Based on the two aspects, it can be determined whether the initial issue has generated at least one derivative issue as time passes. If there is not any derivative issue being generated, go to step S110, displaying the evolution path of the issue. If any derivative issue is generated, go to step S109, determining whether to add new keyword(s). That is, if any new tag is obtained, determining whether to add the new tag to the present keywords group. If it is determined to add a new keyword to the present keywords group, go to step S110, displaying the evolution path of the issue. As mentioned above, the display system 1 for an issue can automatically search and determine the derivative issue, wherein the derivative keyword(s) generated by the derivative issue in the present period is added to the present keywords group for calculations of overlap rate and correlation, until there are no new derivative keyword(s) being generated.

In the following, the algorithm of step S108 is explained in detail. In this embodiment, based on keywords group and correlation of the time period T1, T2 and T3 shown in FIGS. 5A, 5B and 5C, how to determine the present keywords of the time periods T1, T2, T3 and the difference of the correlation between the present keywords of the time periods T1, T2, T3 is described to explain how to determine whether the derivative issue has been generated.

Figure 5A:
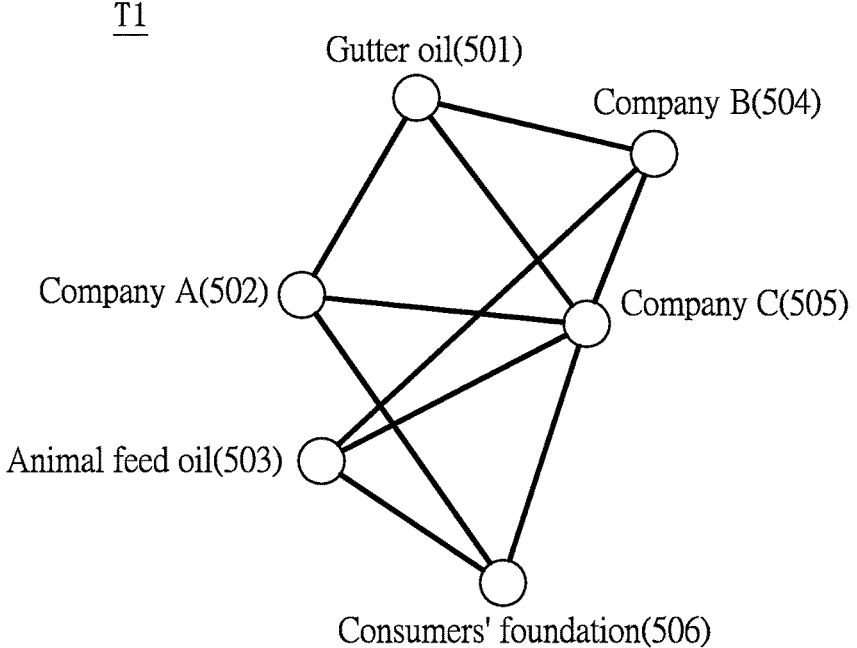
FIG. 5A shows a schematic diagram of correlations between present keywords during time period T1 according to an embodiment of the instant disclosure.
Figure 5B:
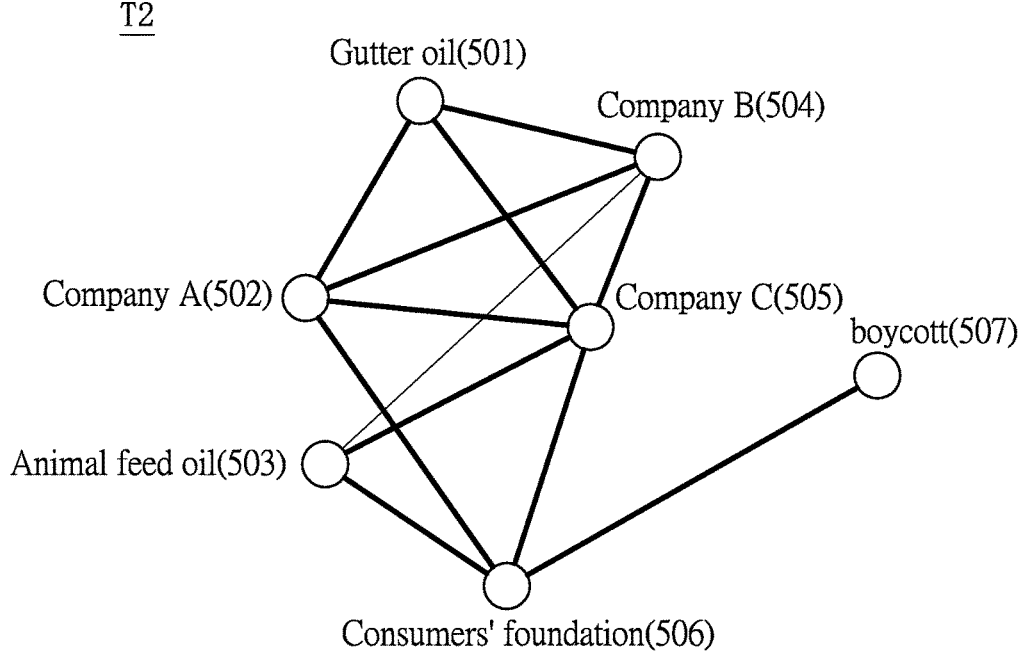
FIG. 5B shows a schematic diagram of correlations between present keywords during time period T2 according to an embodiment of the instant disclosure.

Overlap rate of the keywords is explained by comparing FIG. 5A and FIG. 5B. Suppose the initial keywords are gutter oil (501) and company A (502). In time period T2, except for gutter oil (501), company A (502), animal feed oil (503), company B (504), company C (505) and Consumers' Foundation (506), the present keywords further includes boycott (507). Compared to the time period T1, the processing unit 12 determines whether the at least one derivative issue is generated according to overlap rate for the present keywords compared to the initial keywords.

In one embodiment, it can be seen by comparing FIG. 5B and FIG. 5A, the overlap rate of the present keywords (501-506) during the time period T1 and the initial keywords (gutter oil (501) and company A (502)) is similar to the overlap rate of the present keywords (501-507) during the time period T2 and the initial keywords (gutter oil (501) and company A (502)). In another embodiment, the processing unit 12 also determines the overlap rate of the present keywords and the former keywords of the previous time period. For example, after comparing the present keywords (501-507) during the time period T2 and the present keywords (501-506) during the time period T1, it can be seen that only one present keyword "boycott (507)" is not overlapped, and the other six keywords (501-506) are overlapped. In the same way, comparing FIG. 5B and FIG. 5C, boycott (507), company D (508) and company E (509) are added to the present keywords of the time period T3, that is the overlap of the present keywords during the time period T3 and the present keywords during the time period T2 comprises gutter oil (501), company A (502), animal feed oil (503), company B (504), company C (505) and Consumers' Foundation (506).

About correlation, also taking the gutter oil event that happened in Taiwan as an example, if setting gutter oil (501) and company A (502) as the initial keywords of the selected issue to obtain tags including gutter oil (501), company A (502), animal feed oil (503), company B (504), company C (505), and Consumers' Foundation (506) as the present keywords, analyzing the correlation between these present keywords by calculating the number of the present keywords that occurred in the subject contents of web pages during the time period T1, the number of the present keywords that occurred in the same subject content of one web page, and the social voice corresponding to the subject contents of web pages. The mentioned social voice is an evaluation of people's activities corresponding to the present keywords on the network, such as the number of likes, shares or comments made by the people. For example, the value of the social voice can be calculated by weighting the number of likes, shares or comments. However, the instant disclosure does not restrict the calculation manner of the value of the social voice.

Figure 5C:
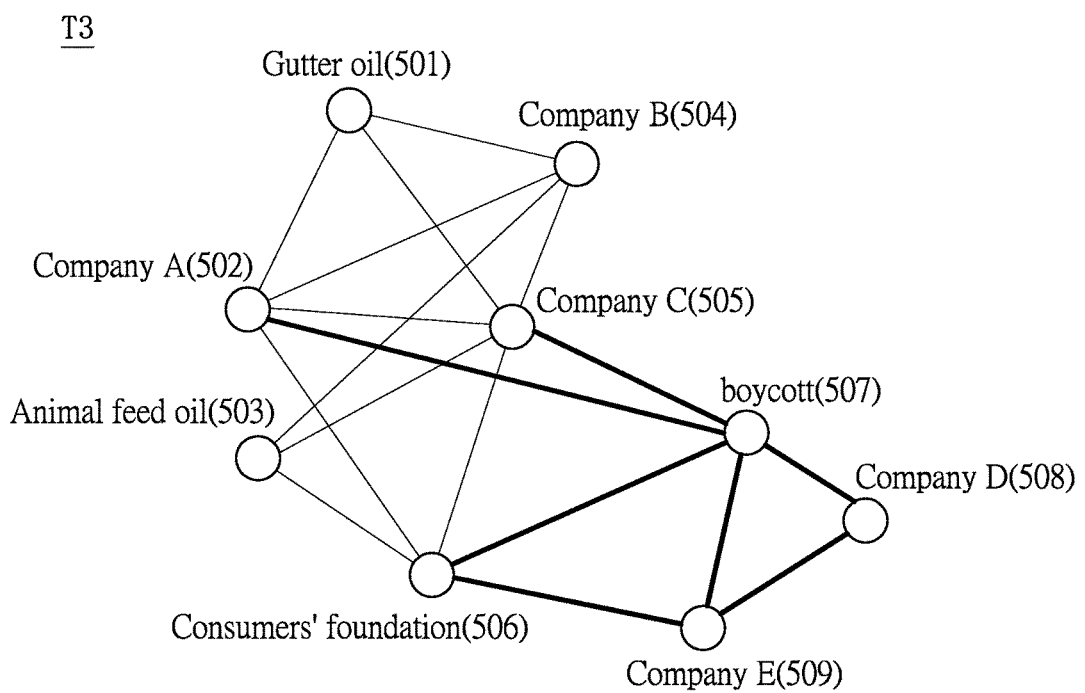
FIG. 5C shows a schematic diagram of correlations between present keywords during time period T3 according to an embodiment of the instant disclosure.

Taking FIG. 5A as an example, the correlation is indicated by the thickness of the line connecting the present keywords. The more the number of the present keywords—gutter oil (501) and company A (502) occurred in the same subject content of a web page, the stronger the correlation between these present keywords—gutter oil (501) and company A (502) is. Also, if the social voice for the gutter oil (501) and company A (502) of the present keywords is greater, the correlation between these present keywords—gutter oil (501) and company A (502) is stronger. If the correlation between gutter oil (501) and company A (502) is stronger, the line plotted between gutter oil (501) and company A (502) is thicker. Furthermore, in FIG. 5B, regarding to the time period T2, a new present keyword (boycott 507) has occurred, also boycott (507) is highly correlated to the Consumers' Foundation (506). In FIG. 5C, regarding to the time period T3, the present keywords having high correlations are company C (505), Consumers' Foundation (506), boycott (507), company D (508) and company E (509). Other present keywords during the time period T3 including gutter oil (501), company A (502), animal feed oil (503) and company B (504) which have lower correlation.

As mentioned above, the processing unit 12 analyses the correlation between the present keywords calculated based on social voice. The processing unit 12 analyses overlap rate for the present keywords compared with the initial keyword(s). The processing unit 12 compares the correlation of the present keywords and the correlation of the initial keywords calculated based on social voice in order to determine whether at least one derivative issue is generated. Explaining is made by using FIG. 5A, FIG. 5B and FIG. 5C. By comparing FIG. 5B and FIG. 5A, overlap rate of the present keywords during the time period T1 and the present keywords during the time period T2 is very high, also the correlation between the present keywords during the time period T1 is similar to the correlation between the present keywords during the time period T2. Thus, it would be determined that there is no derivative issue generated during the time period T2. Comparing FIG. 5A, FIG. 5B and FIG. 5C, overlap rate of the present keywords during the time period T2 and the present keywords during the time period T3 is decreased (compared to the time period T1), and the correlation between the present keywords during the time period T3 is obviously different from the correlation between the present keywords during the time period T1. Thus, it would be determined that at least one derivative issue is generated during the time period T3. The derivative keywords representing the directive issue(s) are company C (505), Consumers' Foundation (506), boycott (507), company D (508) and company E (509).

In another embodiment, a detailed method of determining whether at least one derivative issue is generated is analyzing the difference of the summation of the social voice of the present keywords. For example, when the summation of the social voice of all present keywords of the present keyword group is louder than the summation of the social voice of the initial keyword, the processing unit 13 determines the subject contents of web pages have generated the at least one derivative issue and the mainly discussed issue has been changed.

Figure 6:
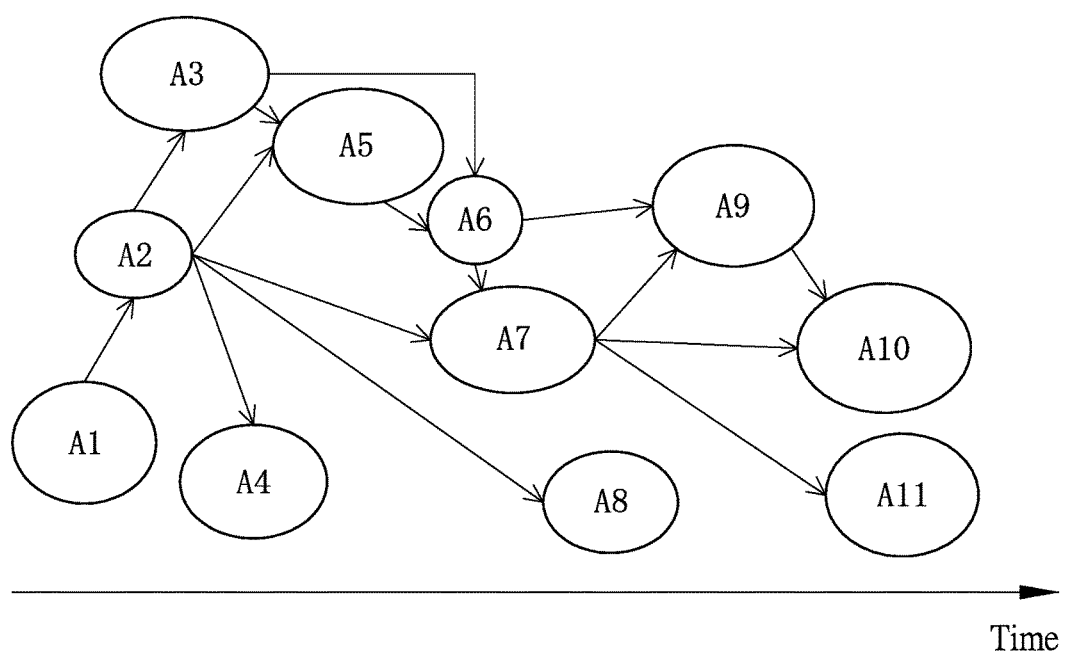
FIG. 6 shows a schematic diagram of visualized issue and directive issues display according to an embodiment of the instant disclosure.

In still another embodiment, the processing unit 12 determines whether the at least one derivative issue is generated according to whether the at least one present keyword with the greater social voice has been changed. Considering comparison between FIG. 5B and FIG. 5C as an example, if the present keywords with a greater social voice during the time period T2 are gutter oil (501), company A (502), animal feed oil (503), company B (504), company C (505), Consumers' Foundation (506) and boycott (507). However, during the time period T3, the present keywords with greater social voice have changed to company C (505), Consumers' Foundation (506), boycott (507), company D (508), and company E (509). Therefore, it can be determined that at least one derivative issue has been generated. Finally, the processing unit 12 controls the display unit 13 to display the at least one derivative issue when the at least one derivative issue is determined to be generated, as shown in FIG. 6. The derivative issues of the derivative issue A2 are A3, A4 and A5. The derivative issues of the derivative issue A3 are A5 and A6. The derivative issue of the derivative issue A5 is A6. Like manner for derivative issues A7, A8, A9, A10, A11 can also be seen in FIG. 6. Accordingly, the evolution process of the issue and the derivative issues can be displayed in a graph. The display system 1 for issue can further provide an interactive interface for the user to select the issue (A1) and the derivative issues (A2-A11) to search for related detailed information.

Figure 7:
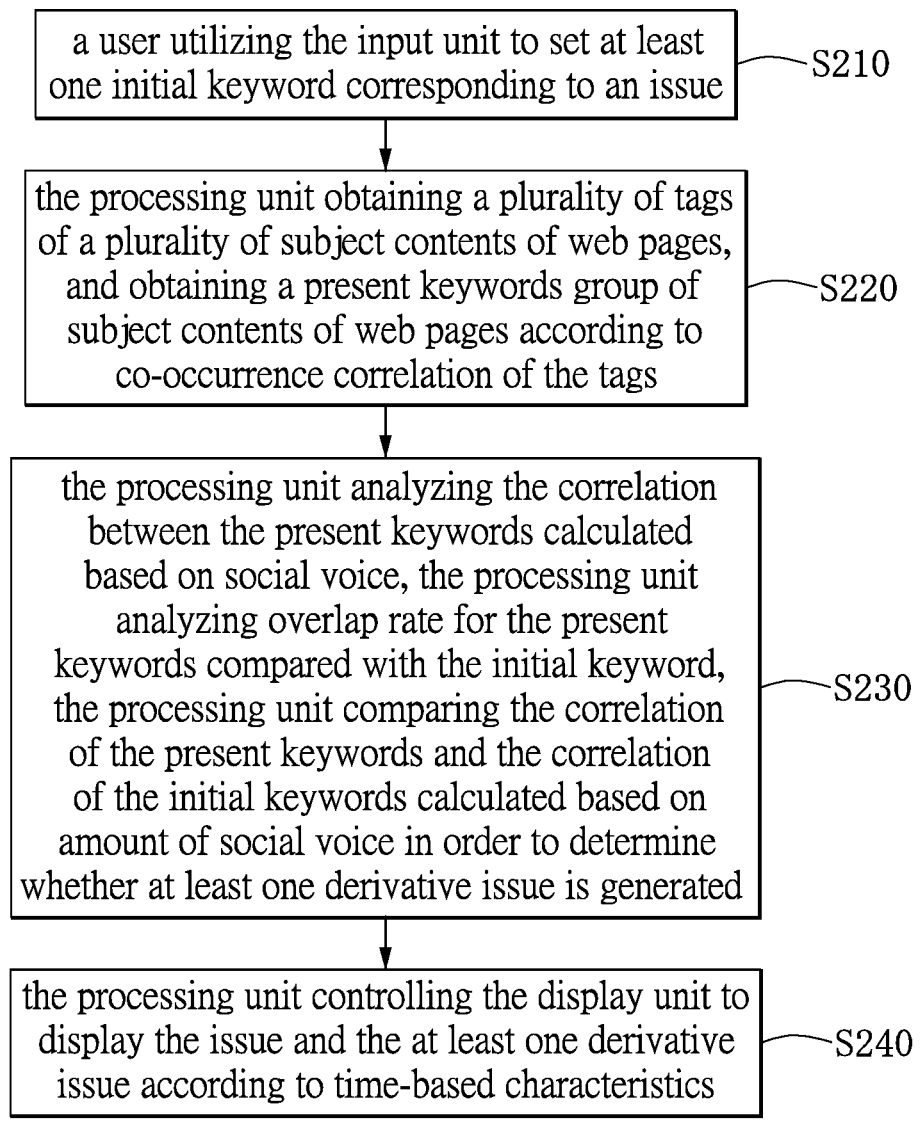
FIG. 7 shows a flow chart of a display method for issue according to an embodiment of the instant disclosure.

Then, please refer to FIG. 7. The concept discussed in FIG. 2 can be summarized in the flow chart shown in FIG. 7. The display method for an issue of this embodiment is executed by the display system 1 for an issue. The display method comprises a user utilizing the input unit (11) to set at least an initial keyword corresponding to an issue (step S210); then, the processing unit (12) obtaining a plurality of tags of a plurality of subject contents of web pages, and obtaining a present keywords group of subject contents of web pages according to co-occurrence correlation of the tags, wherein the present keywords group comprising at least a present keyword (step S220); then the processing unit (12) analyzing the correlation between the present keywords calculated based on social voice, the processing unit (12)

analyzing overlap rate for the present keywords compared with the initial keyword(s), the processing unit (12) comparing the correlation of the present keywords and the correlation of the initial keywords calculated based on social voice in order to determine whether at least one derivative issue is generated (step S230); the processing unit (12) controlling the display unit (13) to display the at least one derivative issue when the at least one derivative issue is determined to be generated; and the processing unit (12) controlling the display unit (13) to display the issue and the at least one derivative issue according to time-based characteristics (step S240).

For the step of setting initial keyword(s) (S210) refer to the aforementioned descriptions about steps S101 and S102 of FIG. 2. For the operation process S220 of the processing unit (12) refer to descriptions about steps S103 to S106 of FIG. 2. For the step S230 refer to descriptions about steps S107 and S108 of FIG. 2. For the step S240 refer to descriptions for FIG. 6.

Additionally, the instant disclosure also provides a computer readable recording media. The computer readable recording media stores computer executable program. When the computer readable recording media is read by a processor the processor executes the computer executable program to perform the display method described above. The computer readable recording media can be a floppy disk, a hard disk, a compact disc, a flash drive, a magnetic tape, a database accessible via network, or any storage media having the same function which is obvious to an artisan of ordinary skill in the art.

According to above descriptions, the provided display system, method and computer readable recording media for an issue of the embodiments can obtain a plurality of subject contents of web pages according to at least one initial keyword, and further obtain the present keywords group of subject contents of web pages. Then, obtaining the social voice of the initial keyword(s) and the present keywords group, and calculating correlation between the present keywords and the initial keyword(s), so as to determining whether any derivative issue is generated or not. Accordingly, the evolution process of the issue can be displayed according to time-based characteristics. Furthermore, an issue evolution process interactive interface for the user, based on a web page, can be presented. In another aspect, the provided display system, method and computer readable recording media for an issue of the embodiments can achieve automatically searching and determining the new or derivative issues, automatically adding keywords of the new or derivative issues, so as to achieve the effect to expand searching issues and determinations for issues.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A display system for an issue in online media, comprising:
   an input unit, receiving at least an initial keyword corresponding to an issue set by a user;
   a display unit, displaying at least a derivative issue generated from the issue during a time period according to time-based characteristics; and
   a processing unit, coupled to the input unit and the display unit, being configured to execute the following operations:
   obtaining a plurality of tags of a plurality of subject contents of web pages;
   obtaining a present keywords group of the subject contents of web pages according to co-occurrence correlation of the tags, the present keywords group comprising at least a present keyword;
   grouping the subject contents of web pages in the manner of title comparison based on the subject contents of web pages captured according to the present keyword group, text comparison or tracking of article links;
   analyzing the social voice related to the at least one present keyword according to the grouped subject contents of web pages in each group;
   calculating overlap rate for the present keyword group comprising the at least one present keywords and the initial keyword;
   comparing the social voice of the at least one present keyword and the social voice of the initial keyword;
   analyzing the correlation between the present keywords calculated based on social voice;
   analyzing overlap rate for the present keywords compared with the initial keyword;
   comparing the correlation of the present keywords and the correlation of the initial keywords calculated based on social voice in order to determine whether at least one derivative issue is generated; and
   controlling the display unit to display the at least one derivative issue when the at least one derivative issue is determined to be generated.

2. The display system for an issue according to claim 1, wherein the initial keyword is obtained by the input unit receiving a web page article related to the issue set by the user and the processing unit analyzing the content of the web page article related to the issue.

3. The display system for issue according to claim 1, wherein the processing unit analyzing the correlation between the present keywords is calculating the number of the present keywords occurring in the subject contents of web pages during the time period, the number of the present keywords occurring in the same subject content of one web page, and the social voice corresponding to the subject contents of the web pages.

4. The display system for an issue according to claim 1, wherein the processing unit obtaining the at least one present keyword of the subject contents of web pages according to co-occurrence correlation of the tags is determining the tag as the at least one present keyword when the number of the tags occurring in the subject contents of web pages exceeds a threshold of occurrence.

5. The display system for issue according to claim 1, wherein the processing unit use K-core algorithm to establish tags of every one subject content of web pages.

6. The display system for issue according to claim 1, wherein the processing unit determines whether the at least one derivative issue is generated according to overlap rate for the present keywords compared to the initial keyword.

7. The display system for issue according to claim 1, wherein the processing unit determines whether the at least one derivative issue is generated according to whether the at least one present keyword with a greater social voice has been changed.

8. The display system for issue according to claim 1, wherein when the summation of the social voice of all present keywords of the present keyword group is louder than the summation of the social voice of the initial keyword, the processing unit determines the subject contents of web pages have generated the at least one derivative issue and the mainly discussed issue has been changed.

9. A display method for an issue in online media, executed by a display system for an issue, the display system for an issue comprising an input unit, a display unit and a processing unit, a user utilizing the input unit to set at least an initial keyword corresponding to an issue, the method being executed by the processing unit and comprising the following steps:
- obtaining a plurality of tags of a plurality of subject contents of web pages;
- obtaining a present keywords group of subject contents of web pages according to co-occurrence correlation of the tags, the present keywords group comprising at least a present keyword;
- grouping the subject contents of web pages in the manner of title comparison based on the subject contents of web pages captured according to the present keyword group, text comparison or tracking of article links;
- analyzing social voice related to the at least one present keyword then according to the grouped subject contents of web pages in each group;
- calculating overlap rate for the present keyword group comprising the at least one present keywords and the initial keyword;
- comparing the social voice of the at least one present keyword and the social voice of the initial keyword;
- analyzing the correlation between the present keywords calculated based on social voice;
- analyzing overlap rate for the present keywords compared with the initial keyword;
- comparing the correlation of the present keywords and the correlation of the initial keywords calculated based on social voice in order to determine whether at least one derivative issue is generated;
- controlling the display unit to display the at least one derivative issue when the at least one derivative issue is determined to be generated; and
- controlling the display unit to display the issue and the at least one derivative issue according to time-based characteristics.

10. The display method for an issue according to claim 9, wherein in the step of setting the initial keyword, the initial keyword is obtained by the input unit receiving a web page article related to the issue set by the user and the processing unit analyzing the content of the web page article related to the issue.

11. The display method for an issue according to claim 9, wherein the processing unit analyzing the correlation between the present keywords is calculated according to the number of the present keywords occurring in the subject contents of web pages during the time period and the number of the present keywords occurring in the same subject content of one web page, and taking into account the social voice corresponding to the subject contents of web pages.

12. The display method for an issue according to claim 9, wherein the processing unit obtaining the at least one present keyword of the subject contents of web pages according to co-occurrence correlation of the tags is determining the tag as the at least one present keyword when the number of the tags occurring in the subject contents of web pages exceeds a threshold of occurrence.

13. The display method for an issue display according to claim 9, further comprising:
- the processing unit using K-core algorithm to establish tags of every one subject content of web pages.

14. The display method for an issue according to claim 9, further comprising:
- the processing unit determining whether the at least one derivative issue is generated according to overlap rate for the present keywords compared to the initial keyword.

15. The display method for an issue according to claim 9, further comprising:
- the processing unit determining whether the at least one derivative issue is generated according to whether the at least one present keyword with greatest amount of social voice has been changed.

16. The display method for an issue according to claim 9, further comprising:
- when the summation of the social voice of all present keywords of the present keyword group is greater than the summation of the social voice of the initial keyword, the processing unit determining the subject contents of web pages have generated the at least one derivative issue and the mainly discussed issue has been changed.

17. A non-transitory computer readable recording media, wherein the non-transitory computer readable recording media stores a computer executable program, when the non-transitory computer readable recording media is read by a processor the processor executes the computer executable program to perform the method of claim 9.

* * * * *